United States Patent [19]

Miyaoh

[11] Patent Number: 5,378,001
[45] Date of Patent: Jan. 3, 1995

[54] METAL LAMINATE GASKET WITH HALF BEADS

[75] Inventor: Yoshio Miyaoh, Tokyo, Japan

[73] Assignee: Ishikawa Gasket Co., Ltd., Tokyo, Japan

[21] Appl. No.: 16,221

[22] Filed: Feb. 11, 1993

[30] Foreign Application Priority Data

Feb. 18, 1992 [JP] Japan .................. 4-006502[U]

[51] Int. Cl.6 .................................................. F16J 15/08
[52] U.S. Cl. .................................................. 277/235 B
[58] Field of Search ............... 277/233, 234, 235 B, 277/236

[56] References Cited

U.S. PATENT DOCUMENTS

| | | | |
|---|---|---|---|
| 4,948,153 | 8/1990 | Takahashi et al. | 277/235 B |
| 5,087,058 | 2/1992 | Miura et al. | 277/235 B |
| 5,197,747 | 3/1993 | Ueta et al. | 277/235 B |
| 5,230,521 | 7/1993 | Ueta | 277/235 B |

FOREIGN PATENT DOCUMENTS

| | | | |
|---|---|---|---|
| 459060 | 12/1991 | European Pat. Off. | 277/235 B |
| 255250 | 11/1986 | Japan | 277/235 B |
| 63-84461 | 6/1988 | Japan . | |
| 210464 | 9/1988 | Japan | 277/235 B |
| 261170 | 5/1990 | Japan . | |

*Primary Examiner*—William A. Cuchlinski, Jr.
*Assistant Examiner*—Scott W. Cummings
*Attorney, Agent, or Firm*—Kanesaka & Takeuchi

[57] ABSTRACT

A metal laminate gasket of the invention is formed of a first metal plate and a second metal plate situated under the first metal plate. The first metal plate includes first outer and inner bending lines surrounding a hole to be sealed. A first inclined wall is situated between the first outer and inner bending lines. The second metal plate includes second inner and outer bending lines surrounding the hole. A second inclined wall is situated between the second outer and inner bending lines. When the gasket is compressed, the first inner bending line is located on the second outer bending line so that substantially even surface pressure is formed by the inclined walls.

9 Claims, 2 Drawing Sheets

METAL LAMINATE GASKET WITH HALF BEADS

BACKGROUND OF THE INVENTION AND RELATED ART STATEMENT

The present invention relates to a metal laminate gasket with half beads for sealing around a hole.

In a metal laminate gasket, it is common to provide a bead on a metal plate around a hole to be sealed. When the bead is compressed, the bead provides surface pressure thereat to seal around the hole.

The bead may have a full bead, i.e. projecting outwardly with two sides, or a half bead, i.e. projecting outwardly with one side. The full bead is formed of a projection or corrugations, and provides high surface pressure. In the other hand, the half bead includes a side wall to form a stepped portion.

When the half bead is compared with the full bead, the half bead is superior to the full bead in recovering ability and provides surface pressure with low tightening force. Thus, the half bead is used as auxiliary sealing means for sealing, for example around a periphery of a gasket.

Recently, in order to make a high power engine, the engine or a part of the engine has been made of an aluminum alloy to have light weight. Since the aluminum alloy is not rigid, if high tightening pressure is applied to the engine made of the aluminum alloy, such engine deforms. Similarly, if high surface pressure is formed by the full bead of the gasket installed in the engine made of the aluminum alloy, the portion of the engine abutting against the full bead may deform.

Since the half bead does not form high surface pressure when the half bead is compressed, the half bead has been used more frequently. Namely, the half bead is used for sealing around an exhaust hole for a manifold gasket, or a water hole or an oil hole for a cylinder head gasket.

In the half bead, the surface pressure is generally formed at bending portions thereof. Namely, one half bead has two portions forming the surface pressure. Thus, the half bead can not provide large sealing area.

In order to provide a large sealing area, in Japanese Utility Model Publication No. 63-84461 published on Jun. 2, 1988, two plates have different half beads to be laterally spaced apart from each other. Although the wide sealing area is formed by the two half beads, surface pressure is not formed even.

In Japanese Utility Model Publication No. 2-61170 published on May 7, 1990, a gasket is formed of a plate with a half bead and a heat insulating material, such as ceramics. Thus, heat from a cylinder head does not escape through a manifold.

In a conventional gasket with half beads, a wide and constant surface pressure is not generally obtained, and no proposal therefor has been made.

Accordingly, one object of the invention is to provide a metal laminate gasket with half beads, which can provide wide and ideal surface pressure.

Another object of the invention is to provide a metal laminate gasket as stated above, wherein surface pressure and width thereof can be easily adjusted.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the present invention, a metal laminate gasket is installed in an engine part having at least one hole to be sealed. The gasket is basically formed of a first metal plate, and a second metal plate situated under the first metal plate.

The first metal plate includes a first hole corresponding to the hole of the engine part, a first outer bending line surrounding the first hole, and a first inner bending line surrounding the first hole and located inside the first outer bending line. Thus, a first inner portion is situated inside the first inner bending line, and a first outer portion is situated outside the first outer bending line.

Also, a first inclined wall is formed between the first outer bending line and the first inner bending line. The first inclined wall inclines relative to the first inner and outer portions so that the first inner and outer portions extend substantially parallel to each other without overlapping with each other.

The second metal plate situated under the first metal plate includes a second hole corresponding to the hole of the engine part, a second outer bending line surrounding the second hole and located inside the first outer bending line, and a second inner bending line surrounding the second hole and located inside the second outer bending line. Thus, a second inner portion is situated inside the second inner bending line, and a second outer portion is situated outside the second outer bending line.

A second inclined wall is formed between the second outer bending line and the second inner bending line. The second inclined wall inclines relative to the second inner and outer portions so that the second inner and outer portions extend parallel to each other without overlapping with each other.

When the first and second metal plates are compressed, the first inner bending line is located to substantially overlap the second outer bending line. Thus, ideal or substantially even surface pressure is formed between the first outer bending line and the second inner bending line.

For example, when the gasket is compressed, the first and second outer bending lines substantially provide surface pressures in downward directions, while the first and second inner bending lines substantially provide surface pressures in upward directions. These bending lines also provide surface pressures in opposite directions as counter actions.

Thus, when considering the surface pressure between the first outer bending line and the second inner bending line, the center area thereof provides high surface pressure by the first inner bending line and the second outer bending line. Since the first inner bending line and the second outer bending line substantially equally overlap with each other, even surface pressures directing to opposite directions can be applied to the engine parts. Substantially even surface pressures are formed by the two half beads.

In the gasket of the invention, additional metal plates may be further laminated over the first and second metal plates to regulate surface pressure.

DETAILED DESCRIPTION OF PREFERRED EMBODIMENTS

Figure 1:
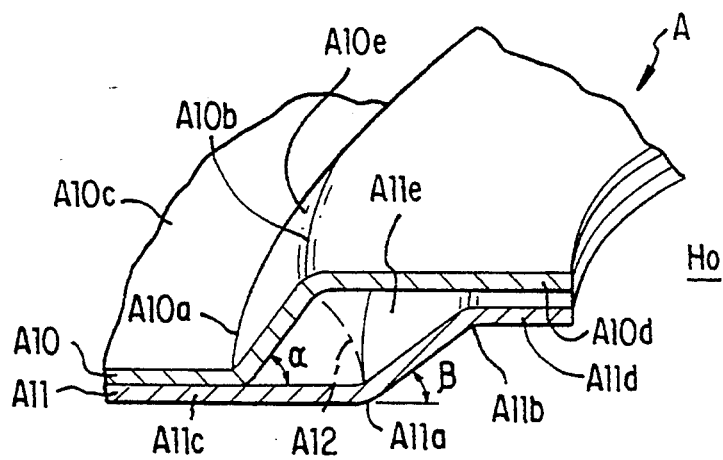
FIG. 1 is an enlarged perspective section view of a first embodiment of a metal laminate gasket of the present invention.

A metal laminate gasket A as shown in FIG. 1 is a part of a cylinder head gasket to be installed between a cylinder head and a cylinder block (both not shown). The gasket A includes a plurality of cylinder bores, water holes and bolt holes, as in the conventional gasket. However, structures around the cylinder bores, the water holes and the bolt holes are omitted, and sealing structure around an oil hole Ho only is shown. In the gasket A, any kind of sealing structure is used around the cylinder bores and the water holes.

The gasket A is formed of an upper plate A10 with an oil hole Ho, and a lower plate A11 with an oil hole Ho. The upper and lower plates A10, A11 substantially extend throughout the entire area of the engine part.

The upper plate A10 includes an outer bending line A10a, and an inner bending line A10b, both surrounding the oil hole Ho. An outer portion A10c is formed outside the outer bending line A10a, and an inner portion A10d is formed inside the inner bending line A10b. Situated between the outer and inner bending lines A10a, A10b is an inclined wall A10e. The outer and inner portions A10c, A10d extend substantially parallel to each other.

The lower plate A11 includes an outer bending line A11a, and an inner bending line A11b, both surrounding the oil hole Ho. An outer portion A11c is formed outside the outer bending line A11a, and an inner portion A11d is formed inside the inner bending line A11b. Also, an inclined wall A11e is situated between the outer and inner bending lines A11a, A11b.

The outer bending line A11a is located such that when the gasket A is compressed, the inner bending line A10b is situated substantially over the outer bending line A11a. Namely, when the gasket A is compressed, the inner bending line A10b is moved along a line A12 and is disposed over the outer bending line A11a.

Inclination angles alpha and beta of the inclined walls A10e, A11e are less than 90 degrees, respectively. In the gasket A, the angle alpha is greater than the angle beta.

In the gasket A, when the plates A10, A11 are assembled, the outer portions A10c, A11c abut against each other, and the inner portion A11d is located under the inner portion A10d to form a space between the inner portions A10d, A11d. The space may not be formed between the inner portions A10d, A11d.

Figure 5:
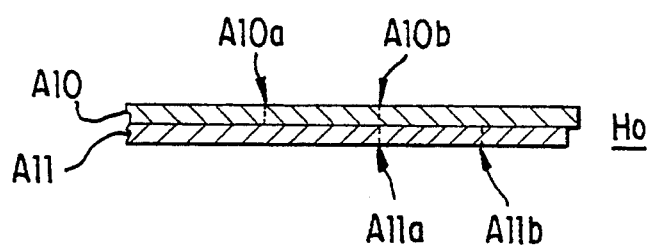
FIG. 5 is a section view for showing a condition that the metal laminate gasket as shown in FIG. 1 is compressed.

When the gasket A thus assembled is compressed (FIG. 5), the outer bending lines A10a, A11a substantially provide surface pressures in downward directions, while the inner bending lines A10b, A11b substantially provide surface pressures in upward directions. These bending lines also provide surface pressures in opposite directions as counter actions.

In the gasket A, the surface pressures between the outer bending line A10a and the inner bending line A11b are formed such that the center area thereof provides high surface pressure by the inner bending line A10b and the outer bending line A11a. Since the inner bending line A10b and the outer bending line A11a substantially equally overlap with each other, even surface pressures directing to opposite directions can be formed in the middle of the sealing area.

The outer bending line A10a and the inner bending line A11b also provide surface pressures to seal around the oil hole Ho. Substantially even surface pressures, which are not so strong, are formed by the two half beads.

Figure 2:
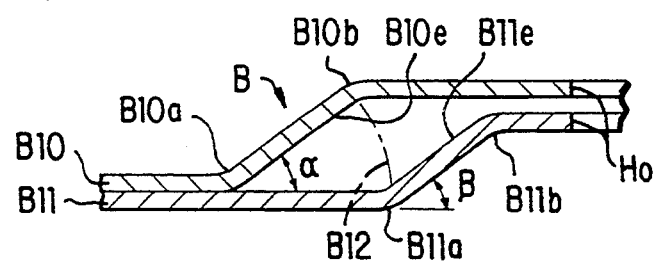
FIG. 2 is a section view of a second embodiment of the metal laminate gasket of the invention.

FIG. 2 shows a second embodiment B of the gasket of the invention. The gasket B includes an upper plate B10 having outer and inner bending lines B10a, B10b and an inclined wall B10e, and a lower plate B11 having outer and inner bending lines B11a, B11b and an inclined wall B11e, as in the gasket A.

In the gasket B, however, an angle alpha is equal to an angle beta so that the inclined walls B10e, B11e are arranged parallel to each other. In the gasket B, the equal surface pressures are formed by the bending lines B10b, B11a. The gasket B operates as in the gasket A.

Figure 3:
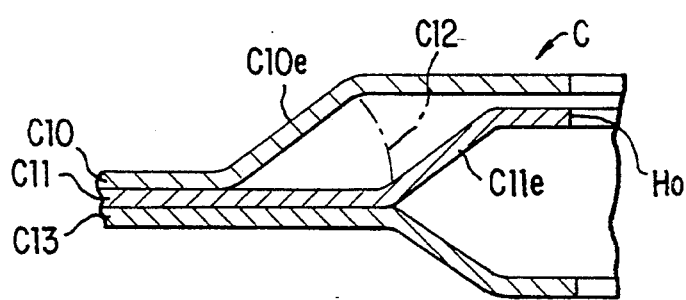
FIGS. 3 and 4 are section views of third and fourth embodiments of the metal laminate gasket of the invention.

FIG. 3 shows a third embodiment C of the gasket of the invention. The gasket C includes an upper plate C10 with an inclined wall C10e, and a lower plate C11 with an inclined wall C11e, as in the gasket B.

In the gasket C, further, an outer plate C13 is installed under the lower plate C11. The outer plate C13 is exactly the same as the lower plate C11, and is arranged symmetrically to a lower surface of the lower plate C11. In the gasket C, since the outer plate C13 is provided in addition to the gasket B, an additional surface pressure is formed at a portion close to the oil hole Ho.

Figure 4:
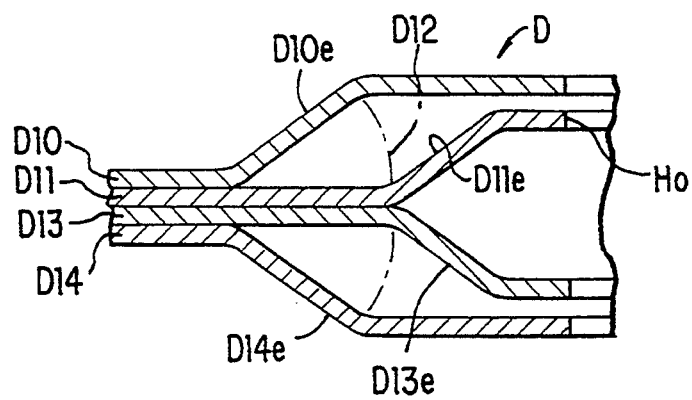

FIG. 4 shows a fourth embodiment D of the gasket of the invention. The gasket D includes an upper plate D10 with an inclined wall D10e, a middle plate D11 with an inclined wall D11e, a middle plate D13 with an inclined wall D13e, and a lower plate D14 with an inclined wall D14e. Namely, the gasket D has a shape such that two gaskets B are arranged symmetrically to each other. In the gasket D, although the gasket D is thick, the surface pressure around the hole Ho becomes large. The gasket D operates as in the gasket B.

In the present invention, at least two half beads are arranged to be spaced apart from each other such that the ends of the half beads overlap when the gasket is tightened. As a result, the half beads can provide wide and even surface pressure.

While the invention has been explained with reference to the specific embodiments of the invention, the explanation is illustrative and the invention is limited only by the appended claims.

What is claimed is:

1. A metal laminate gasket for an engine part having at least one hole to be sealed, comprising:

a first metal plate including a first hole corresponding to the hole of the engine part, a first outer bending line surrounding the first hole, a first inner bending line surrounding the first hole and located inside the first outer bending line, a first inner portion situated inside the first inner bending line, a first outer portion situated outside the first outer bending line, and a first inclined wall situated between the first outer bending line and the first inner bending line and inclined relative to the first inner and outer portions so that the first inner and outer portions extend substantially parallel to each other without overlapping with each other, and a second metal plate situated under the first metal plate, said second metal plate including a second hole corresponding to the hole of the engine part, a second outer bending line surrounding the second hole, a second inner bending line surrounding the second hole and located inside the second outer bending line, said second outer and inner bending lines being located closer to the hole of the engine part relative to the first inner bending line when the first and second metal plates are assembled together, a second inner portion situated inside the second inner bending line, a second outer portion situated outside the second outer bending line, and a second inclined wall situated between the second outer bending line and the second inner bending line and inclined relative to the second inner and outer portions so that the second inner and outer portions extend parallel to each other without overlapping with each other, said second outer bending line being located to substantially overlap the first inner bending line when the first and second metal plates are compressed so that surface pressures at the first inner bending line and the second outer bending are directed in opposite directions at a position equally spaced from the hole of the engine part and wide surface pressure is formed between the first outer bending line and the second inner bending line when the first and second metal plates are compressed.

2. A metal laminate gasket according to claim 1, wherein said first inner portion is situated at a predetermined distance away from the second inner portion to form a space therebetween.

3. A metal laminate gasket according to claim 2, wherein said first inclined wall inclines at an angle greater than that of the second inclined wall.

4. A metal laminate gasket according to claim 2, wherein said first and second inclined walls incline substantially parallel to each other.

5. A metal laminate gasket according to claim 2, further comprising a third metal plate laminated under the second metal plate, said third metal plate having an inclined wall substantially the same as the second inclined wall and extending in a direction opposite to the second inclined wall.

6. A metal laminate gasket according to claim 5, further comprising a fourth metal plate laminated under the third metal plate, said fourth metal plate having an inclined wall substantially the same as the first inclined wall and extending in a direction opposite to the first inclined wall.

7. A metal laminate gasket according to claim 1, wherein said first inner portion is located horizontally above the first outer portion, and the second inner portion is located horizontally above the second outer portion when the first and second plates are assembled together.

8. A metal laminate gasket according to claim 7, wherein said second inner portion is located in a horizontal level between the first inner and outer portions when the plates are assembled together.

9. A metal laminate gasket according to claim 8, wherein high surface pressure is formed in a middle of a portion between the second inner bending line and the first outer bending line where surface pressure is formed.

* * * * *